United States Patent [19]

Barbee, Jr.

[11] Patent Number: 4,915,463

[45] Date of Patent: Apr. 10, 1990

[54] MULTILAYER DIFFRACTION GRATING

[75] Inventor: Troy W. Barbee, Jr., Palo Alto, Calif.

[73] Assignee: The United States of America as represented by the Department of Energy, Washington, D.C.

[21] Appl. No.: 259,564

[22] Filed: Oct. 18, 1988

[51] Int. Cl.⁴ .............................................. G02B 5/18
[52] U.S. Cl. ..................... 350/1.1; 350/1.7; 350/162.19; 350/162.22; 350/162.23
[58] Field of Search ............. 350/1.1, 1.6, 1.7, 162.11, 350/162.17, 162.19, 162.22, 162.23, 162.24, 320, 321; 428/570; 164/14, 72, 75

[56] References Cited

U.S. PATENT DOCUMENTS

| | | | |
|---|---|---|---|
| 2,688,094 | 8/1954 | Dumond | 250/53 |
| 3,688,109 | 8/1972 | Gamble | 250/51.5 |
| 3,887,261 | 6/1975 | Spiller | 350/1 |
| 3,980,883 | 9/1976 | Franks | 50/272 |
| 4,101,200 | 7/1978 | Daxinger | 350/166 |
| 4,313,648 | 2/1982 | Yano et al. | 350/166 |
| 4,576,439 | 3/1986 | Gale et al. | 350/162.23 |
| 4,675,889 | 6/1987 | Wood et al. | 378/84 |
| 4,693,933 | 9/1987 | Keem et al. | 428/333 |

OTHER PUBLICATIONS

Vidal et al., SPIE, vol. 563, pp. 142 to 149, (1985).
Ceglio et al., SPIE, vol. 563, pp. 360 to 366, (1985).
Ciarlo et al., SPIE, vol. 688, pp. 163 to 170 (1986).
Barbee, Jr., Opt. Eng. 25, pp. 898 to 915, (1986).
Barbee, Jr., Appl. Phys. Lett. 50(25), pp. 1841 to 1843, (1987).
Cartwright, JOSA 21, pp. 785 to 791, (1931).
Barbee, Jr., Springer Series in Optical Sciences, vol. 43, pp. 144 to 162, (1984).
Barbee, Jr., AIP Conference Proceedings, No. 75, pp. 131 to 145 (1981).
Keski—Kuha, R., Applied Optics, vol. 23, No. 20, Oct. 15, 1984, pp. 3534–3537.

Primary Examiner—Bruce Y. Arnold
Assistant Examiner—Thong Nguyen
Attorney, Agent, or Firm—Gary C. Roth; L. E. Carnahan; William R. Moser

[57] ABSTRACT

This invention is for a reflection diffraction grating that functions at X-ray to VUV wavelengths and at normal angles of incidence. The novel grating is comprised of a laminar grating of period D with flat-topped grating bars. A multiplicity of layered synthetic microstructures, of period d and comprised of alternating flat layers of two different materials, are disposed on the tops of the grating bars of the laminar grating. In another embodiment of the grating, a second multiplicity of layered synthetic microstructures are also disposed on the flat faces, of the base of the grating, between the bars. D is in the approximate range from 3,000 to 50,000 Angstroms, but d is in the approximate range from 10 to 400 Angstroms. The laminar grating and the layered microstructures cooperatively interact to provide many novel and beneficial instrumentational advantages.

6 Claims, 2 Drawing Sheets

MULTILAYER DIFFRACTION GRATING

The U.S. Government has rights in this invention pursuant to Contract No. W-7405-ENG-48 between the U.S. Department of Energy and the University of California for the operation of the Lawrence Livermore National Laboratory.

BACKGROUND TO THE INVENTION

The invention described herein relates generally to diffraction gratings, and more particularly to X-ray to VUV reflection diffraction gratings.

A diffraction grating may be very broadly defined as any arrangement which imposes on an incident wave a periodic variation of amplitude or phase, or both. See the standard text "Principles of Optics, Third Edition", by Max Born and Emil Wolf, Pergamon Press (1965), which is incorporated by reference herein. There are many different kinds of diffraction gratings. Any structure which is periodic in space will serve as a diffraction grating. A very well known type of grating is the transmission diffraction grating, made by ruling equally spaced lines through a silver film that is deposited upon a transparent glass plate. As light passes through this grating, it is diffracted by the narrow slits, usually of equal width and separated by equal distances, in the opaque silver film.

A reflection diffraction grating is produced by ruling a multitude of fine, parallel, equidistant grooves, by means of a diamond point driven by a ruling machine, upon a plate of polished speculum metal. Speculum metal is a hard and brittle alloy of copper and tin, that is capable of taking a brilliant polish, and that is commonly used for making reflectors. If light is incident upon the grating at any angle with respect to the normal, light will be diffracted from the surface of the grating at all angles. A non-spectral, central image is emitted from the grating in the direction of regular reflection, where the angle of incidence is equal to the angle of diffraction. Two series of spectral images, of increasing order, are laterally disposed on either side of the central, zero order image. The dispersion, or separation, of the wavelengths within a diffracted spectrum, increases in proportion to the order of the spectrum. The shape of the grooves of the grating determines the direction into which the diffracted light will be predominantly thrown. For example, if one face of the grooves is flat, a maximum of energy will be cast into the direction which makes an angle with this face which is equal to the angle made by the incident light with this face. This technique is called blazing, and the spectral order that lies in the blazed direction will be intense.

Synthetic structures, known as multilayers and consisting of alternating layers of high and low atomic number elements, are described in "Multilayers for X-ray Optics", Opt. Eng. 25, pages 898 to 915 (1986), by Troy W. Barbee, Jr. A molybdenum-silicon multilayer monochrometer for use in the extreme ultraviolet, is described by Troy W. Barbee, Jr. et al in Appl. Phys. Lett. 50 (25), pages 1841 to 1843 (1987).

Keski-Kuha, in Applied Optics 23, 3534 (1984), discloses the potential use of layered synthetic microstructures as coatings on diffraction gratings to enhance normal incidence reflection efficiencies. An actual 5000 line per millimeter plane holographic grating was produced that was first coated with iridium, and then with a five layered iridium-silicon layered synthetic microstructure. At 304 Angstroms, the first order efficiency of the grating was enhanced by approximately the factor three. At longer wavelengths the efficiency was reduced.

Vidal et al, in SPIE Vol. 563, 142 (1985) profess to develop a formalism for rigorously computing the efficiency of multilayer coated gratings.

Ceglio et al, in SPIE Vol. 563, 360 (1985) discuss a concept for output coupling from an X-ray laser cavity, wherein a diffraction pattern is lithographically produced on or in a multilayer structure. It is suggested that the pattern may provide periodic or aperiodic amplitude or phase modulation of mirror reflection, with reflected X-rays diffracted into multiple orders. Note particularly FIG. 4(c).

Ciarlo et al, in SPIE Vol. 688, 163 (1986), disclose the use of anisotropic etching to fabricate diffraction gratings on silicon wafers for use as substrates for layered synthetic multilayers. Work on the fabrication of blazed gratings is reported.

Franks in U.S. Pat. No. 3,980,883 issued Sept. 14, 1976 discloses an X-ray diffraction grating in which the grooves are uniformly spaced but of varying depth, to thereby reduce the variation of efficiency of the grating in the region of the wavelength of maximum efficiency. The maximum efficiency of the grating is lowered. To function, X-rays must impinge on this phase grating at extremely small angles of grazing incidence.

Keem et al in U.S. Pat. No. 4,693,933 issued Sept. 15, 1987 teach X-ray dispersive and reflective structures that comprise alternating layers of metallic and nonmetallic materials, with the potential of the layers interacting controlled by utilizing an interfacial buffer layer between the layers.

Wood et al in U.S. Pat. No. 4,675,889 issued June 23, 1987 discuss X-ray dispersive structures, comprised of layer sets formed on one another, which reflect two or more wavelengths at the same or different angles.

Yano et al in U.S. Pat. No. 4,313,648 issued Feb. 2, 1982 disclose a patterned multi-layer structure for a stripe filter used for a photoelectric pickup tube. The multi-layer optical filter is patterned by reactive sputter etching into a stripe pattern.

Spiller in U.S. Pat. No. 3,887,261 issued June 3, 1975 teaches a reflective structure for optical waves that comprises an array of alternate layers of high and low absorbing elements, with the layers coated on top of each other.

Gamble in U.S. Pat. No. 3,688,109 issued Aug. 29, 1972 discusses the use of structurally layered heavy metal chalcogenides as diffraction grating crystals in X-ray optical assemblies.

Daxinger in U.S. Pat. No. 4,101,200 issued July 18, 1978 discloses a light transmitting coating comprised of alternating metallic and non-metallic layers.

Gale et al in U.S. Pat. No. 4,576,439 issued Mar. 18, 1986 teach an improved authenticating device wherein a reflective and diffractive coating layer is situated between the substrate and overcoat layers of the device. The coating layer is divided into a set of small and slightly separated regions, thereby allowing a direct bond of the overcoat layer to the substrate layer within the separation areas.

Dumond in U.S. Pat. No. 2,688,094 issued Aug. 31, 1954 discloses a point focusing X-ray monochromator for low angle X-ray diffraction, that utilizes two crystal reflecting surfaces.

Because of their great power for penetration, X-rays are diffusely scattered from within the body of any material, and consequently are essentially not specularly reflected from any single surface, when directed at that surface at ordinary angles of incidence such as, for example, 30 or 45 degrees. Even though X-rays are reflected from polished surfaces when introduced thereto at nearly grazing incidence, and X-ray diffraction gratings operative at extremely shallow angles of incidence, measured in minutes of arc, have been constructed, there remains a critical need for high resolution and high efficiency reflection diffraction gratings, for X-ray to VUV energies, that are operative at normal and near normal angles of incidence.

SUMMARY OF THE INVENTION

It is, therefore, an object of the invention to provide an X-ray to VUV reflection diffraction grating.

Another object of the invention is to provide an efficient, high resolution, X-ray to VUV reflection diffraction grating that is operative at normal and near normal angles of incidence.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, a novel, reflection multilayer diffraction grating, operative in the X-ray to VUV energy range, is provided. The novel grating, which is efficient and has high resolution, and operates at normal and near normal angles of incidence, combines cooperatively interacting laminar diffraction grating and multilayer microstructure elements. The invention is of a reflection diffraction grating that comprises a reflection laminar diffraction grating of period D that has a multiplicity of flat-topped grating bars attached to a common base, that are all parallel and equally spaced. The tops of the grating bars are all coplanar and provide a surface. A multiplicity of layered synthetic microstructures of period d are individually and coveringly disposed over the flat tops of the grating bars. Each microstructure is comprised of a common, that is, of an equal, number of flat and parallel alternating layers of two different materials. All the layers that are comprised of the first material are approximately equal in thickness. Similarly, all layers comprised of the second material are approximately equal in thickness. Since the microstructures are all located on the coplanar flat tops of the grating bars, the corresponding layers of all the layered microstructures are similarly coplanar with one another. That is, all the first layers, that are comprised of the same one of the two materials, are coplanar. Similarly, all the second layers, that are comprised of the other one of the two materials, are coplanar. And so on, for all the layers of the microstructures. The laminar grating and the layered microstructures cooperatively interact to provide that when radiation is incident on the top surface of the novel reflection diffraction grating at an angle A, it is grating dispersed from the zero order reflective path at an angle B, such that the generalized grating equation for the grating is very accurately given by the approximate expression $$\sin B \approx \frac{2md}{nD} \left[ 1 - \frac{2f - f^2}{\sin^2 A} \right]^{1/2},$$

where m is the grating order, n is the order of Bragg reflection, and f is one minus the spatially averaged index of refraction of the layered synthetic microstructures.

Preferably the parallel grating bars, of the laminar grating, are equally spaced apart from one another by a distance in the approximate range from 3,000 to 50,000 Angstroms; and, also preferably, any two adjacent microstructure layers have a combined thickness in the approximate range from 10 to 400 Angstroms.

Preferably the flat-topped grating bars of the reflection laminar diffraction grating are commonly fabricated by being anisotropically etched from a single crystal of silicon.

It is also preferable that all corresponding layers, of each synthetic microstructure, be commonly synthesized in place by physical vapor deposition, wherein individual magnetron sputter sources are employed for each of the two different materials of the layers.

It is further preferable that the two different materials of the alternating layers of the microstructures be material pairs selected from the group consisting of rhodium and carbon, molybdenum and silicon, tungsten and carbon, tungsten and silicon, stainless steel and silicon, palladium and carbon, molybdenum disilicide and silicon, and tungsten carbide and carbon.

A second embodiment of the novel grating of this invention comprises a reflection laminar diffraction grating of period D. The laminar grating comprises parallel and equally spaced flat-topped grating bars that are attached to a common base. The tops of the bars provide a first surface that is parallel to and spaced apart by the distance H from a second surface provided by the flat faces of the bases that are between the bars. Multiplicities of layered synthetic microstructures, of period d, are on the flat tops of the bars and the flat faces, of the base, between the bars. Corresponding layers of the microstructures are parallel and coplanar. The laminar grating and the two multiplicities of layered microstructures cooperatively interact to provide that when radiation is incident on the first and second surfaces of the novel grating at an angle A, it is grating dispersed from the zero order reflective path at an angle B, so that $$H/d = m'/n \left[ 1 - \frac{2f - f^2}{\sin^2 A} \right]^{1/2}$$

and $$(m'/m) \sin B \approx 2 H/D.$$

In these expressions, m' is the laminar order, m is the grating order of dispersed radiation, n is the order of Bragg reflection, and f is one minus the spatially averaged index of refraction of the layered synthetic microstructures.

Preferably the parallel grating bars, of the laminar grating, are equally spaced apart from one another by a distance in the approximate range from 3,000 to 50,000 Angstroms; and, also preferably, any two adjacent microstructure layers have a combined thickness in the approximate range from 10 to 400 Angstroms.

Preferably the flat-topped grating bars of the reflection laminar diffraction grating are commonly fabricated by being anisotropically etched from a single crystal of silicon.

It is also preferable that all corresponding layers, of each synthetic microstructure, be commonly synthesized in place by physical vapor deposition, wherein individual magnetron sputter sources are employed for each of the two different materials of the layers.

It is further preferable that the two different materials of the alternating layers of the microstructures be material pairs selected from the group consisting of rhodium and carbon, molybdenum and silicon, tungsten and carbon, tungsten and silicon, stainless steel and silicon, palladium and carbon, molybdenum disilicide and silicon, and tungsten carbide and carbon.

The benefits and advantages of the present invention, as embodied and broadly described herein, include, inter alia, the provision of an efficient, high resolution, X-ray to VUV reflection diffraction grating that is operative at normal and near normal angles of incidence.

BRIEF DESCRIPTION OF THE DRAWINGS

The accompanying drawings, which are incorporated and form a part of the specification, illustrate an embodiment of the invention and, together with the description, serve to explain the principles of the invention. In the drawings.

DETAILED DESCRIPTION OF THE INVENTION

Figure 1:
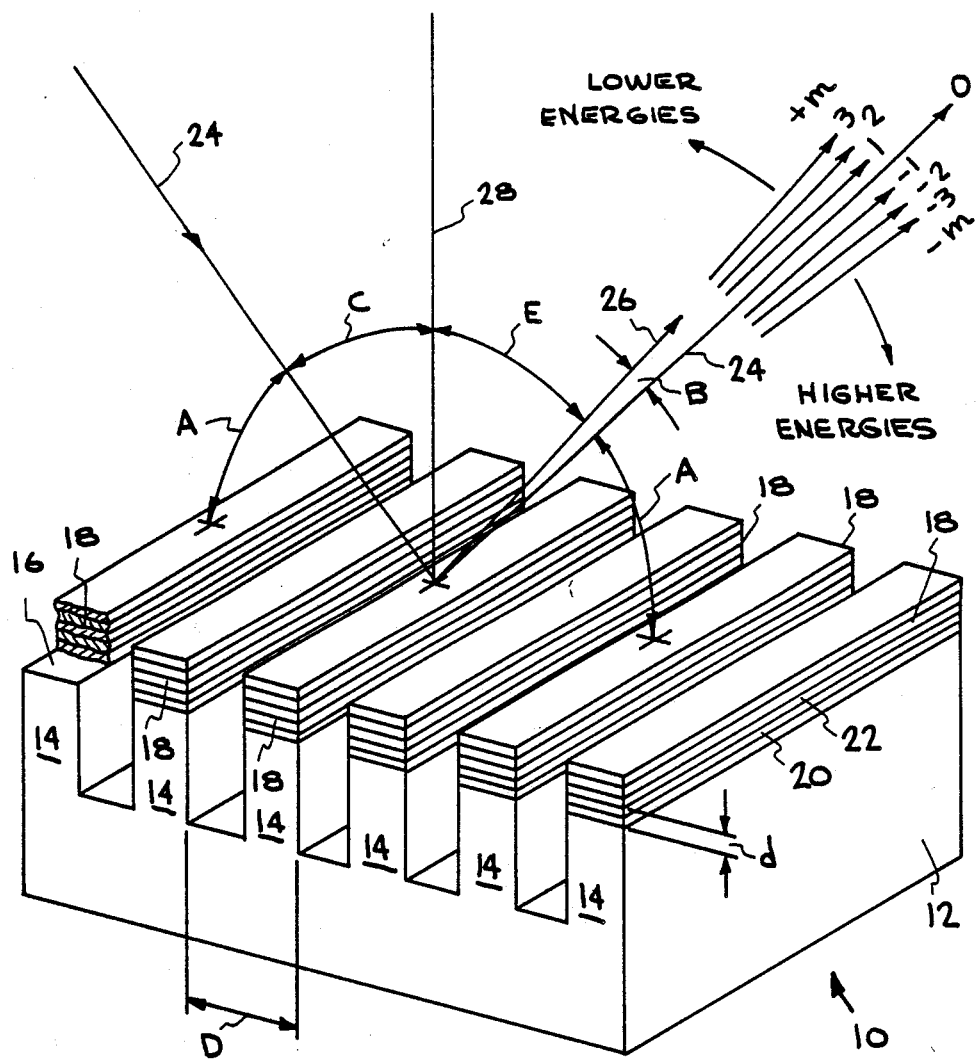
FIG. 1 is a schematic and perspective drawing of a laminar reflection diffraction grating in accordance with this invention.

Reference will now be made in detail to the present preferred embodiment of this invention, an example of which is illustrated in the accompanying drawings. FIG. 1 is a schematic and perspective drawing of an efficient, high resolution X-ray to VUV reflection diffraction grating 10, that is operative at normal and near normal angles of incidence. Diffraction grating 10 is comprised of a reflection laminar diffraction grating 12, that has a multiplicity of parallel and equally spaced grating bars 14. Each of grating bars 14 is flat-topped, with the flat tops of all grating bars 14 being mutually coplanar, as typically exemplified by a flat top surface 16 that is shown by cut-away exposure in FIG. 1. Reflection laminar diffraction gratings are of ancient lineage and very well known, being described by, among others, Cartwright in JOSA 21, 785 (1931), which is incorporated by reference herein. The reflection laminar diffraction grating 12 is prepared from a single crystal of silicon by a lithographic process wherein the material between grating bars 14 is anisotropically etched away. Depending upon the use intended for grating 10, grating bars 14 are equally spaced apart from one another by the distance D, that is in the approximate range from 3,000 to 50,000 Angstroms. That is, D is the period, or the grating space, or distance between corresponding points of adjacent grooves, of the laminar grating 12. A multiplicity of layered synthetic microstructures, 18, each comprised of a common number of flat and parallel alternating layers of two different materials, are coveringly disposed over the flat tops of the multiplicity of grating bars 14, as shown. A typical layer pair of the microstructures 18 is a layer pair 20 and 22. All the layers of microstructures 18 that are comprised of a first material are of approximately equal thickness and, similarly all the layers of microstructures 18 that are comprised of the other material are of approximately equal thickness. Thus, any two adjacent microstructure layers, such as layers 20 and 22, of the microstructures 18, have a combined thickness of d that is in the approximate range from 10 to 400 Angstroms. Thus, d is the period of layered microstructures 18. All the corresponding layers of each of microstructures 18 are coplanar with one another, as shown. The corresponding layers of each of microstructures 18 are commonly synthesized in place by physical vapor deposition employing individual magnetron sputter sources for each of the two different materials. This process of physical vapor deposition is very well known and is described, for example, in "Sputtered Layered Synthetic Microstructure (LSM) Dispersion Elements" by Troy W. Barbee, Jr., in "Low Energy X-ray Diagnostics-1981", Edited by Attwood and Henke, API Conference Proceedings Number 75, page 131 (1981); and, in "Multilayers for X-ray Optical Applications" by T. W. Barbee, Jr., in "Springer Series in Optical Sciences, Volume 43: X-ray Microscopy", page 144, published by Springer-Verlag, Berlin, Heidelberg, New York, and Tokyo (1984). These two references are incorporated by reference herein. The alternating layers of microstructures 18 may be comprised of any two different materials. However, it is frequently preferred that the alternating layers be comprised of rhodium and carbon, molybdenum and silicon, tungsten and carbon, tungsten and silicon, stainless steel and silicon, palladium and carbon, molybdenum disilicide and silicon, and tungsten carbide and carbon.

X-ray to VUV reflection diffraction grating 10 is a combined and cooperatively interacting structure, comprising the reflection laminar diffraction grating 12 of period D, and layered microstructures 18 of period d. As shown in FIG. 1, radiation, represented by an arrow 24, incident on grating 10 at angle A with respect to the surface 16, is reflected by diffraction by each layered microstructure 18 at an equal exit angle A, in zeroeth order. The angle A is frequently referred to as the grazing angle of incidence. Interference of the radiation diffracted by all the microstructures 18, results in radiation that is grating dispersed from the zero order path, for example along the path indicated by arrow 26, which is at the angle B from the zero order beam. The combined radiation diffracted from microstructures 18 is grating dispersed into a multiplicity of positive and negative orders, m, as shown. The positive orders are dispersed at angles that are closer to the normal, 28, to the top surface of grating 10, and the negative orders are dispersed at angles farther from normal 28, as indicated. Higher orders are regularly and farther dispersed from the zero order beam, than are the lower orders, also as shown.

The reflected radiation of wavelength λ that is diffracted at angle A from each of layered synthetic microstructures 18, may be simply described by Bragg's equation which, in its simplest form, is $$n\lambda = 2d \sin A \qquad (1)$$

where n is the order of Bragg reflection. The Bragg equation analytically relates the wavelength λ and the angle A, at which constructive interference, of radiation scattered by a periodic layered microstructure of period d, occurs. Since the index of refraction, I, of the materials that comprise microstructures 18 is not, except incidentally, unity, equation 1 must be corrected for Snell's law. The index of refraction of microstructures 18, which is commonly less than one at X-ray wavelengths, may be expressed $$I = 1 - f \quad (2)$$

where f includes scattering and absorption related terms, is functional of λ and certain atomic parameters of the materials that comprise microstructures 18, and must be spatially averaged to accommodate the layer thicknesses of the two materials that comprise the layer pairs, such as pair 20 and 22, of microstructures 18. By the use of Snell's law it can easily be shown that the refraction corrected form of Bragg's equation, equation 1, is $$n\lambda = 2d \sin A \left[ 1 - \frac{2f - f^2}{\sin^2 A} \right]^{1/2} \quad (3)$$

which is the appropriate equation for use in analyzing the dispersion of grating 10.

As is very well known and described in many texts, such as "The Diffraction of Light, X-Rays, and Material Particles", by C. F. Meyer, Ann Arbor (1949), the generalized grating equation for laminar diffraction grating 12 is $$m\lambda = D(\sin C - \sin E) \quad (4)$$

where C and E are angles relative to normal 28, as shown in FIG. 1, and m is the grating order of the dispersed radiation. Equation 4 may be equivalently expressed $$m\lambda = D[\cos A - \cos(A + B)] \quad (5)$$

which may be recast $$\frac{m\lambda}{D \sin A} = \sin B + \cot A (1 - \cos B). \quad (6)$$

Since B is ordinarily a small angle, the cot A (1−cos B) term may be neglected in equation 6, to provide the approximate, but usually quite accurate, expression $$\frac{m\lambda}{D \sin A} \approx \sin B. \quad (7)$$

Equation 3 and expression 7 may be combined, to eliminate explicit reference to λ, and to provide with high accuracy $$\sin B \approx \frac{2md}{nD} \left[ 1 - \frac{2f - f^2}{\sin^2 A} \right]^{1/2} \quad (8)$$

which may be expressed as sin B approximately equaling 2 md/nD times a refraction correction term.

Expression 8 has many unique characteristics that betoken the extraordinary value of novel X-ray to VUV reflection diffraction grating 10. The dispersion angle B is essentially constant, with the only angular or wavelength dependence being contained in the refraction correction term. The refraction correction term is typically very small and often nearly constant over broad spectral ranges. Thus, the measurement of B as a function of wavelength permits the direct measurement of f. Further, since B is inversely proportional to n, grating 10 separates the Bragg orders diffracted by layered microstructures 18. Additionally, since B is essentially independent of wavelength, grating 10 may be used to function as a constant resolution dispersion element for any given geometry. And also, B, independent of refraction, may be simply determined, for m and n equal to one, from the ratio d/D.

It has further been experimentally observed that novel gratings such as grating 10, disperse light in a continuous manner with high energies appearing at small Bragg angles, and lower energies appearing at larger Bragg angles, as indicated in FIG. 1. The novel gratings of this invention thus act as X-ray prisms, and will allow the fabrication of fixed angle of incidence spectrographs having resolutions and spectral ranges defined by d, D, and the parameters of the materials that comprise layered microstructures 18.

Figure 2:
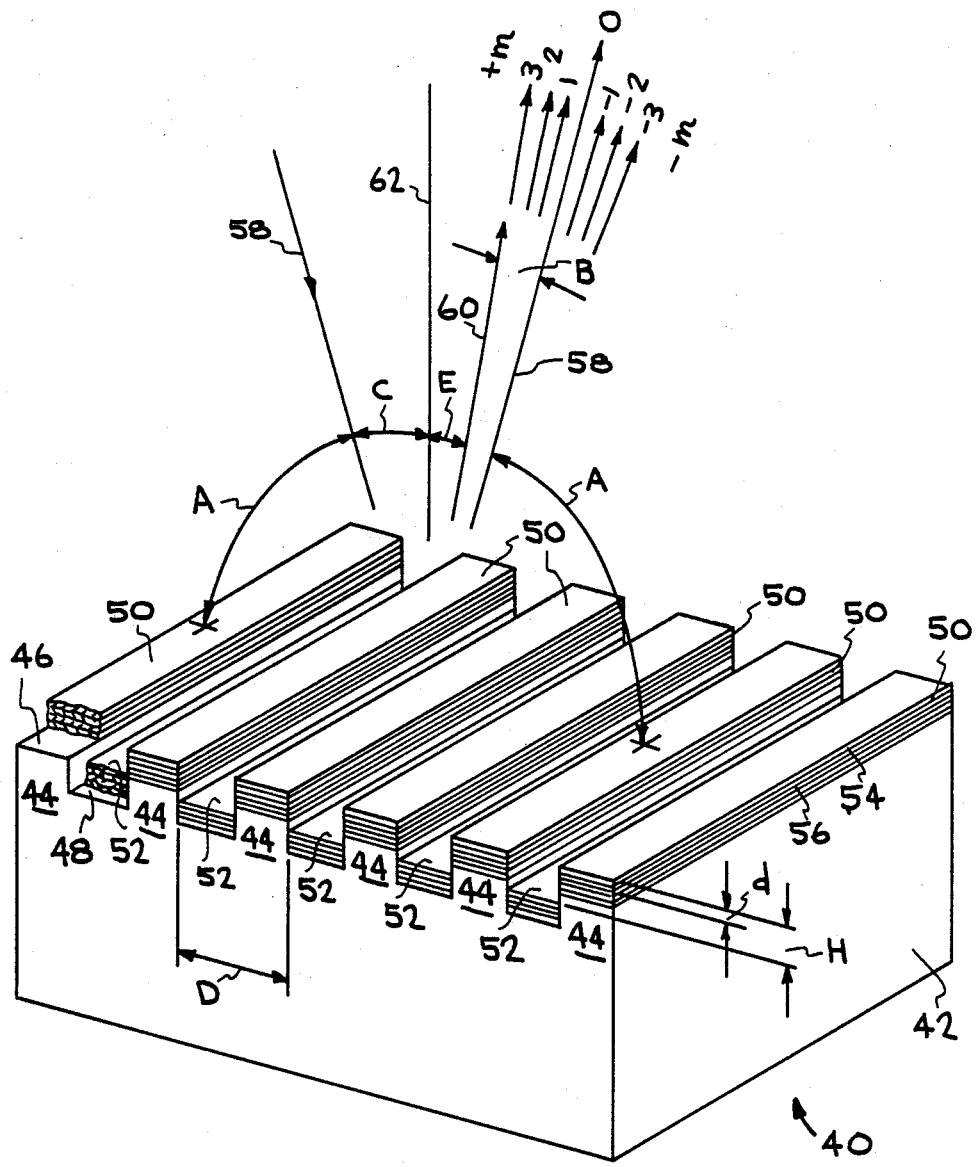
FIG. 2 is a schematic and perspective drawing of a second laminar reflection diffraction grating in accordance with this invention.

FIG. 2 is a schematic and perspective drawing of a second embodiment of an efficient, high resolution X-ray to VUV reflection diffraction grating 40, that is operative at normal and near normal angles of incidence, and is in accordance with the invention. Diffraction grating 40 is comprised of a reflection laminar diffraction grating 42, that has a multiplicity of parallel and equally spaced grating bars 44. Each of grating bars 44 is flat-topped, with the flat tops of all grating bars 44 being mutually coplanar, as typically exemplified by a flat top surface 46 that is shown in cut-away exposure in FIG. 2. Grating 42 provides coplanar flat faces, between the bars 44, as typically exemplified by a flat face surface 48, that is shown in cut-away exposure in FIG. 2. Surfaces 46 and 48 are parallel to one another and spaced apart by the perpendicular distance H, as shown. The reflection laminar diffraction grating 42 is prepared from a single crystal of silicon by a lithographic process wherein the material between grating bars 44 is anisotropically etched away. The period D, as shown, of grating 42 is preferably in the approximate range from 3,000 to 50,000 Angstroms. A first multiplicity of layered synthetic microstructures, 50, each comprised of a common number of flat and parallel alternating layers of two different materials, are coveringly disposed over the flat tops of the multiplicity of grating bars 44, as shown. A second multiplicity of layered synthetic microstructures, 52, of the same composition and structure as the microstructures 50, are coveringly disposed on the flat faces, such as 48, between bars 44, as shown. A typical layer pair of the microstructures 50 and 52, is the layer pair 54 and 56. All the layers of microstructures 50 and 52 that are comprised of a first material are of approximately equal thickness and, similarly all the layers of microstructures 50 and 52 that are comprised of the other material are of approximately equal thickness. Thus, any two adjacent microstructure layers, such as layers 54 and 56, of the microstructures 50 and 52, have a combined thickness of d that is in the approximate range from 10 to 400 Angstroms. Thus, d is the period of layered microstructures 50 and 52. All the corresponding layers of each of microstructures 50 are coplanar with one another, and all the corresponding layers of microstructures 52 are coplanar with one another, as shown. The corresponding layers of each of microstructures 50 and 52 are commonly synthesized in place by physical vapor deposition employing an individual magnetron sputter source for each of the two different materials. The alternating layers of microstructures 50 and 52 may be comprised of any two different materials. However, it is frequently preferred that the alternating layers be comprised of rhodium and carbon, molybdenum and silicon, tungsten and carbon, tungsten and silicon, stainless steel and silicon, palladium and carbon, molybdenum disilicide and silicon, and tungsten carbide and carbon.

Grating 40 is a combined and cooperatively interacting structure comprising the reflection laminar grating 42, of period D, and layered microstructures 50 and 52, of period d, that are separated by the distance H. As shown in FIG. 2, radiation, represented by an arrow 58, incident on grating 40 at angle A with respect to the surfaces 46 and 48, is reflected by diffraction by each of layered microstructures 50 and 52 at an equal exit angle A, in zeroeth order. The angle A is frequently referred to as the grazing angle of incidence. Interference of the radiation diffracted by all the microstructures 50 and 52, results in radiation that is grating dispersed from the zero order path, for example along the path indicated by arrow 60, which is at the angle B from the zero order beam. The combined radiation diffracted from microstructures 50 and 52 is grating dispersed into a multiplicity of positive and negative orders, m, as shown. The positive orders are dispersed at angles that are closer to the normal, 62, to the top surface of grating 40, and the negative orders are dispersed at angles farther from normal 62, as indicated. Higher orders are regularly and farther dispersed from the zero order beam, than are the lower orders, also as shown.

In grating 40, the path length difference between radiation reflected from microstructures 50 and 52 must be an integral number of wavelengths. This is analytically given as $$m'\lambda = 2 H \sin A \quad (9)$$

where m' is the laminar order. As discussed above in reference to grating 10 of FIG. 1, the refraction corrected form of Bragg's equation for grating 40 of FIG. 2 is $$n \lambda = 2 d \sin A \left[ 1 - \frac{2f - f^2}{\sin^2 A} \right]^{1/2} \quad (10)$$

where n is the order of Bragg reflection and f is as defined above. Equations (9) and (10) may be combined to give $$H/d = m'/n \left[ 1 - \frac{2f - f^2}{\sin^2 A} \right]^{1/2}. \quad (11)$$

By defining the refraction corrected multilayer period, d', as $$d' = d \left[ 1 - \frac{2f - f^2}{\sin^2 A} \right]^{1/2} \quad (12)$$

equation (11) may be expressed as $$H/d' = m'/n. \quad (13)$$

Consequently, because the refraction correction term $$\left[ 1 - \frac{2f - f^2}{\sin^2 A} \right]^{1/2}$$

is usually, for VUV and X-ray radiation, essentially constant over broad ranges of A, grating 40 will always be on order for all wavelengths. This constitutes a unique and very important property for grating 40.

Proceeding, the approximate expression (7) above, derived for grating 10 of FIG. 1, also holds for grating 40 of FIG. 2. Thus $$m \lambda \approx D \sin A \sin B \quad (14)$$

where m is the grating order of dispersed radiation. Expression (14) and equation (9) may be combined to give $$(m'/m) \sin B \approx 2H/D. \quad (15)$$

This expression (15) means that the multilayer grating constructive interference condition is met in all orders, when the expression is satisfied, and constitutes a second unique and very important property for grating 40.

It is thus appreciated that in accordance with the invention as herein described and shown in FIGS. 1 and 2, an efficient, high resolution, X-ray to VUV reflection diffraction grating, that is operative at normal and near normal angles of incidence, is provided.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, gratings can be constructed in accordance with this invention wherein the flat top surfaces of the grating bars are parallel but not coplanar, being rather all tilted at a common angle C with respect to the general structure of the grating. In this geometry, if the ratio of the tilt angle C to the dispersion angle B, as defined above, is an integer, the grating will always be on blaze. That is to say, the maximum intensity diffracted by the multilayers on the tilted surfaces will be directed into the C/B order of the grating. Additionally, constructive interference in this order will occur for all wavelengths diffraction reflected by the multilayers, as defined by the Bragg equation.

The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An X-ray to VUV reflection multilayer diffraction grating, that comprises:
 a reflection laminar diffraction grating of grating period D, that comprises a multiplicity of parallel and equally spaced flat-topped grating bars that are all attached to a common base, with all the flat tops of the grating bars being coplanar with one another and providing a surface;
 a multiplicity of layered synthetic microstructures of microstructure period d, with each microstructure comprised of a common number of flat and parallel alternating layers of two different materials, with all the layers comprised of the first material being approximately equal in thickness and all the layers comprised of the second material being approximately equal in thickness, and with a single microstructure coveringly disposed over the flat top surface of each of the multiplicity of grating bars so that all the corresponding layers of each of the microstructures are coplanar with one another; and
 said reflection laminar diffraction grating and said multiplicity of layered synthetic microstructures cooperatively interacting to provide that when radiation is incident on the reflection multilayer diffraction grating at an angle A with respect to the surface of the grating, the radiation is grating dispersed from the zero order reflective path at an angle B, such that the generalized grating equation for the multilayer diffraction grating is given with a high degree of accuracy by $$\sin B \approx \frac{2md}{nD}\left[1 - \frac{2f - f^2}{\sin^2 A}\right]^{1/2},$$

wherein,
 m is the grating order of the dispersed radiation,
 n is the order of Bragg reflection, and
 f is one minus the spatially averaged index of refraction of the layered synthetic microstructures;
 wherein the multiplicity of parallel grating bars have a grating period D in the approximate range from 3,000 to 50,000 Angstroms;
 wherein any two adjacent microstructure layers have a combined thickness in the approximate range from 10 to 400 Angstroms;
 wherein the multiplicity of flat-topped grating bars of the reflection laminar diffraction grating are commonly fabricated by being anisotropically etched from a single crystal of silicon;
 wherein all the corresponding layers of each of the microstructures are commonly synthesized in place by physical vapor deposition employing individual magnetron sputter sources for each of the two different materials; and
 wherein the two different materials of the alternating layers of the microstructures are material pairs selected from the group consisting of rhodium and carbon, molybdenum and silicon, tungsten and carbon, tungsten and silicon, stainless steel and silicon, palladium and carbon, molybdenum disilicide and silicon, and tungsten carbide and carbon.

2. An X-ray to VUV reflection multilayer diffraction grating, that comprises:
 a reflection laminar diffraction grating of grating period D, that comprises a multiplicity of parallel and equally spaced flat-topped grating bars that are all attached to a common base, with all the flat tops of the grating bars being coplanar with one another and providing a first surface, and with the base providing a multiplicity of coplanar flat faces between the bars that provide a second surface, with the first surface and the second surface parallel to one another and spaced apart by the perpendicular distance H;
 a first and a second multiplicity of layered synthetic microstructures of microstructure period d, with each microstructure comprised of a common number of flat and parallel alternating layers of two different materials, with all the layers comprised of the first material being approximately equal in thickness and all the layers comprised of the second material being approximately equal in thickness, with a single microstructure of the first multiplicity disposed over the flat top first surface of each of the multiplicity of grating bars so that all the corresponding layers of each of the first multiplicity of microstructures are coplanar with one another, and with a single microstructure of the second multiplicity disposed over the flat second surface of each of the multiplicity of the base faces so that all the corresponding layers of each of the second multiplicity of microstructures are coplanar with one another; and
 said reflection laminar diffraction grating and said first and said second multiplicities of layered synthetic microstructures cooperatively interacting to provide that when radiation is incident on the reflection multilayer diffraction grating at an angle A with respect to the first and second surfaces of the grating, the radiation is grating dispersed from the zero order reflective path at an angle B, such that $$H/d = m'/n\left[1 - \frac{2f - f^2}{\sin^2 A}\right]^{1/2}$$

and, (m'/m) sin B ≈ 2H/D wherein
 m' is the laminar order,
 m is the grating order of dispersed radiation,
 n is the order of Bragg reflection, and
 f is one minus the spatially averaged index of refraction of the layered synthetic microstructures.

3. A reflection multilayer diffraction grating as recited in claim 6, wherein the multiplicity of parallel grading bars have a grating period D in the approximate range from 3,000 to 50,000 Angstroms, and wherein any two adjacent microstructure layers have a combined thickness in the approximate range from 10 to 400 Angstroms.

4. A reflection multilayer diffraction grating, as recited in claim 3, wherein the multiplicity of flat-topped grating bars of the reflection laminar diffraction grating are commonly fabricated by being anisotropically etched from a single crystal of silicon.

5. A reflection multilayer diffraction grating, as recited in claim 4, wherein all the corresponding layers of each of the microstructures are commonly synthesized in place by physical vapor deposition employing individual magnetron sputter sources for each of the two different materials.

6. A reflection multilayer diffraction grating, as recited in claim 5, wherein the two different materials of the alternating layers of the first and second multiplicities of microstructures are material pairs selected from the group consisting of rhodium and carbon, molybdenum and silicon, tungsten and carbon, tungsten and silicon, stainless steel and silicon, palladium and carbon, molybdenum disilicide and silicon, and tungsten carbide and carbon.

* * * * *